United States Patent [19]

Hoff

[11] 4,035,994
[45] July 19, 1977

[54] LAWN MOWER BLADE CONTROL APPARATUS

[75] Inventor: Stephen J. Hoff, Richmond, Ind.

[73] Assignee: Hoffco, Inc., Richmond, Ind.

[21] Appl. No.: 581,029

[22] Filed: May 27, 1975

[51] Int. Cl.² .......................................... A01D 75/20
[52] U.S. Cl. ..................................... 56/11.3; 56/10.5; 56/11.5; 188/166
[58] Field of Search .................... 56/11.3, 11.7, 11.8, 56/11.5, 10.5, 17.4, 11.1; 142/105 BA, 105 CD; 188/77, 166, 167

[56] References Cited

U.S. PATENT DOCUMENTS

| | | | |
|---|---|---|---|
| 2,273,328 | 2/1942 | Miller | 188/77 R |
| 2,329,881 | 9/1943 | Clapper | 56/11.3 |
| 2,803,972 | 8/1957 | Leigh | 188/77 R |
| 2,875,858 | 3/1959 | Dunham | 188/77 R |
| 3,026,665 | 3/1962 | Hoff | 56/11.3 |
| 3,228,177 | 1/1966 | Coates | 56/10.5 |
| 3,253,391 | 5/1966 | Meldahl | 56/11.3 |
| 3,290,871 | 12/1966 | Haas | 56/10.5 |

*Primary Examiner*—J.N. Eskovitz
*Attorney, Agent, or Firm*—Jenkins, Hanley & Coffey

[57] ABSTRACT

Mounting and control apparatus for a driven element such as a lawn mower blade mounted coaxially on an engine drive shaft, in an arrangement in which, under control of a deadman lever, the driven element is normally de-clutched from the shaft and stopped by a brake, as when the driving engine is idled, and for operation is released by the brake and clutched by a centrifugal clutch to the drive shaft, as when the engine is speeded up. The compact nested assembly includes a driven drum element having an outer cylindrical brake and clutch drum and an inner bearing ring which lies within the axial length of the drum and is mounted on the outer race of a ball bearing carried by a reduced-diameter bearing sleeve on a main hub fixed to the motor shaft. A clutch carrier plate on the hub carries centrifugal shoes engageable with the inside of the drum and partially nested between it and the bearing ring. The hub carries a flywheel when the engine is designed to depend on the mower blade for flywheel mass. A protective bowl about the assembly forms a mounting platform for an arcuate brake-mounting plate which supports an elongated brake band about the drum. One band end straddles and is anchored to the plate; the other straddles the plate and is connected between a brake-applying spring anchored on the plate and a brake-release link connected to an eccentric pin on a crank wheel rotatable on the mounting plate.

8 Claims, 8 Drawing Figures

LAWN MOWER BLADE CONTROL APPARATUS

BACKGROUND OF THE INVENTION

For a number of years there has been a growing appreciation of the danger and other disadvantages of the common practice of fixing a rotary mower blade directly on the depending drive shaft of an engine. My prior U.S. Pat. No. 3,026,665 of Mar. 27, 1962 points out that such direct drive causes engine shafts to be bent when the blade strikes an obstruction, that overloading the direct-driven blade stalls the engine, with resulting inconvenience, and that that direct drive endangers the operator and others because the blade always rotates with the engine, even during starting and idling. The seriousness of this latter danger now appears to be leading to government safety requirements for a "deadman" lever on the mower handle which will stop the blade except when the operator is in operating position and holding the lever. To be effective, a deadman control requires high reliability, and if its use is not to impose undue cost on the consumer, a highly practical, effective, and inexpensive mounting and control arrangement is required. The present invention seeks to provide such a blade mounting and control arrangement which can be applied to various presently-designed mowers with a minimum of change and expense. The invention is also useful in other applications where similar control is desirable, as on snowblowers, garden power tools, etc.

SUMMARY OF THE INVENTION

In accordance with the present invention, the lawn mower blade, or other output element, is mounted on a driven element carried coaxially on a hub which fits on a drive shaft, in a substantially self-contained, compact, nested arrangement in which the driven element is firmly supported for free rotation relative to the hub, so as to allow the shaft to rotate freely when the driven element is stopped. The hub has an upper portion to fit about the shaft, with an inner face to engage the shaft end, a reduced-diameter portion which forms a bearing sleeve terminating at an outward-facing shoulder. The driven drum element has an outer cylindrical drum for engagement from within by centrifugal clutch shoes and from without by a brake band. A radial web at one end of the drum joins it to an inner bearing ring extending within the drum and carrying an in-turned end flange. A ball bearing has its inner race mounted, as with a press-fit, on the bearing sleeve of the hub and its outer race mounted, as with a press-fit, in the bearing ring of the driven drum element, so as to firmly support the driven drum element for free rotation on the hub. When the hub is mounted on the engine shaft, an axial bolt secures a retainer washer against the inner race, the latter against the hub shoulder, and the hub against the end of the shaft, so that these parts are firmly secured relative to the shaft. The mower blade is mounted, as by bolts, against a blade mounting plate which bears against the outer bearing race to secure the same in the bearing ring and against its end flange, and firmly secures the driven parts element in operative relation with the hub and shaft.

A centrifugal shoe carrier plate on the hub carries centrifugal clutch shos within the drum, in nested relation between the drum and the bearing ring. The shoes are preferably biased to retracted position as by springs. The hub may also carry a flywheel, particularly when the engine is designed to depend on the balde for flywheel action, since the blade is no longer fixed to the shaft. When the motor has an adequate flywheel of its own, the flywheel is preferably omitted from the present assembly.

The assembly is housed within a protective bowl. This is preferably mounted by a thin flange received beneath the mounting flange of the motor on the deck of the mower, so that in an existing mower design it produces no significant change in the position of the motor and allows the blade to be in substantially the same position as in the standard mower. The bowl is shaped to substantially enclose and protect the entire assembly but is also especially shaped to provide an annular platform intermediate the height ot the driven drum. A brake mounting plate on such platform supports a brake band about the drum, and desirably lies between bifurcations at the ends of the band. One end of the band is held by an anchor pin on the mounting plate. The other end is engaged with a draw pin which is biased toward brake-applying position, as by a spring anchored on the plate, and is connected by a link to an eccentric crank pin on a crank wheel rotatably mounted on the mounting plate. An actuating cable in a peripheral groove in the crank wheel runs to the manually operated deadman lever on the mower handle. The crank pin moves between a normal slack position in which it allows the spring to apply the brake and an actuated position in which it moves the free end of the brake band against the spring to a brake-released position, and the actuated position is close to, but short or dead center, so as to maintain some spring force tending to return the brake to applied position but to substantially reduce the effective lever arm of the torque exerted on the crank wheel by the spring, in relation to the lever arm of the torque applied by the cable, and thereby reduce the manual force required on the cable to maintain the brake off. The draw pin at the free end of the brake band is desirably guided in its movement by a guide on the mounting plate, and its throw is limited by a stop to prevent the crank from reaching a fully dead center position. Desirably, it is stopped at a point from 4° to 15° before dead center.

The deadman lever is connected jointly to the brake release cable and to the speed-control of the engine so that as it releases the brake it accelerates the engine to cause the centrifugal clutch to engage the drum and drive the mower blade, and as it applies the brake it decelerates the engine and thereby disengages the clutch. The brake will assist in such deceleration.

The assembly forms a substantially self-contained arrangement which is adapted to be readily applied to mowers by existing design, with a minimum of change, to provide the advantages of improved drive and blade control, and to bring them into compliance with government safety requirements. The blade mounting and drive is a substantially self-contained assembly with the hub, and the latter can be made to fit any desired or standard size shaft. The brake mounting and actuating assembly is likewise self-conained with built-in limits on the location and movement of its parts so that little or no adjustment of other or remote parts is required to ensure accurate and reliable operation.

While the invention has been described in relation to the mounting and drive of a lawn mower blade, it will be understood that the mounting and drive assembly and brake mechanism may be used to drive and control other operating elements, for example, a snow blower or an agricultural cultivator or the like.

The compact nested mounting and clutch assembly forms an especially advantageous combination with the brake mounting and actuating assembly, but it is to be understood that each may be used separately or in combination with other components. The brake assembly may be used, for example, in a blade mounting and control arrangement in which the blade is fixedly mounted on the engine shaft and in which release of the deadman control lever, beside engaging the brake, closes a shorting circuit for the ignition of the engine and "kills" the engine, as in the safety-control system proposed in the Coates U.S. Pat. No. 3,228,177 of Jan. 11, 1966.

BRIEF DESCRIPTION OF THE DRAWINGS

The accompanying drawings illustrate the invention and show a preferred embodiment. In such drawings.

DESCRIPTION OF THE PREFERRED EMBODIMENT

Figure 1:
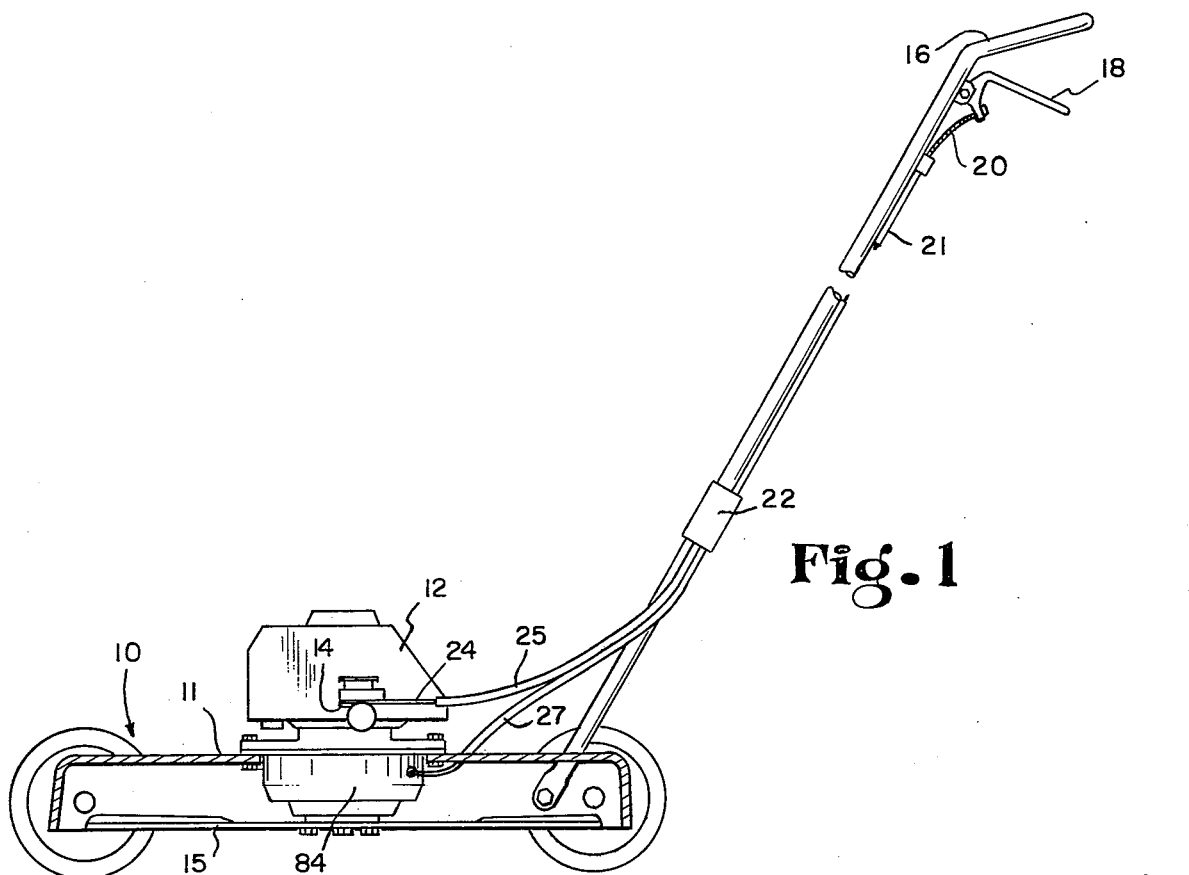
FIG. 1 is s side elevation of a lawn mower embodying the invention.
Figure 2:
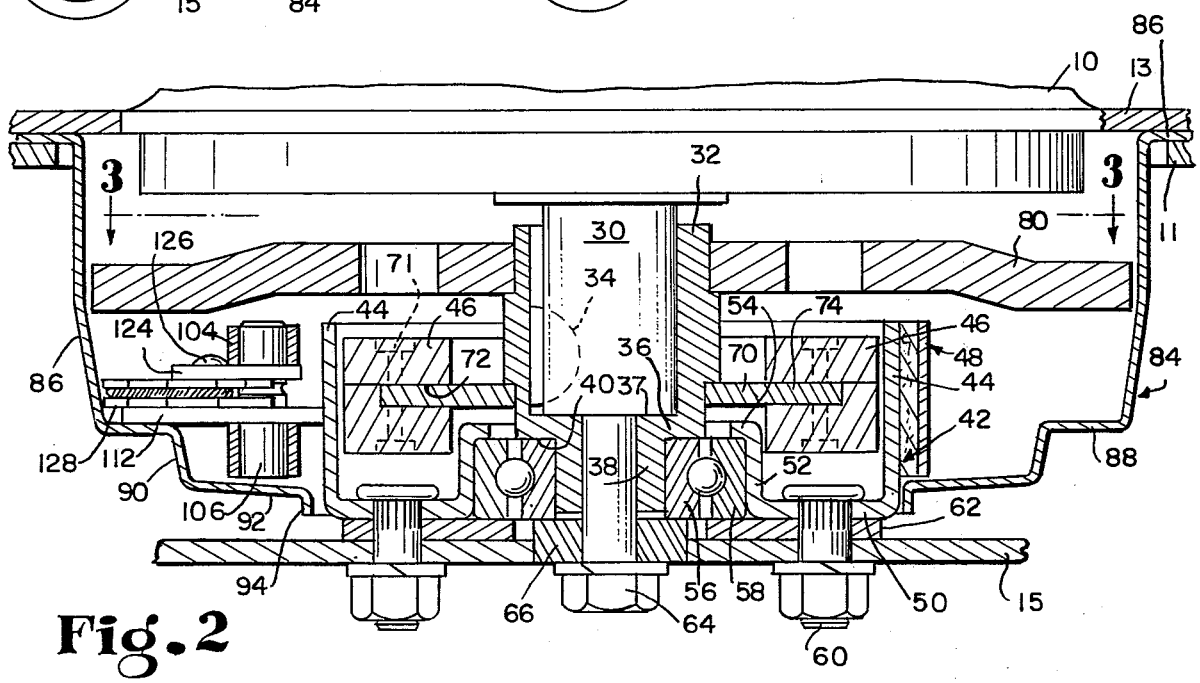
FIG. 2 is a vertical section on the axis of the lawn mower engine, showing a mounting and control assembly in accordance with the invention.

The embodiment shown in FIGS. 1-6 of the drawings is intended for application to any of various standard or existing rotary lawn mowers of the type shown diagrammatically in FIG. 1. Such lawn mower comprises a wheeled housing 10 in the shape of an inverted pan having a top deck 11 which carries a vertical-shaft engine 10 bolted to the deck about the edges of a central opening, with the engine shaft projecting downward centrally of the housing and supporting a blade 15. The engine is desirably a conventional variable-speed internal combustion engine provided with a manually operable speed control or throttle 14 movable between an idling position and a mowing position. The engine may also have conventional controls for varying the idle speed and the mowing speed, and the mower may have powered propulsion. The mower shown is a manual-propulsion mower having a handle 16 provided with a "deadman" lever 18. The deadman lever 18 is connected by a main cable 20 in a sheath 21 to a coupler 22 which connects the main cable 20 both to a throttle cable 24 in a sheath 25 and a brake cable 26 in a sheath 27. When the deadman lever 18 is in its released position as shown in FIG. 1, the throttle 14 is in the idle position and the brake calbe is in a position to apply the brake to stop the blade. To operate the mower, the operator pulls the deadman lever 18 upward against the handle 16 and holds it there. This moves the throttle 14 to its mowing position and accelerates the engine to mowing speed, which may be controlled by a governor. This also pulls the brake cable 26 to release the brake on the blade and permit the engine to drive the blade 15 at cutting speed.

In the blade mounting and control arrangement shown in FIGS. 2-6, the shaft 30 of the engine 10 projects downward below the deck 11 of the mower housing. The shaft carries a hub 32 keyed to it by a key 34. The large upper or main portion of the hub 32 contains a bore to fit the shaft 30, and such bore terminates at a radial wall 36 which forms an inner face 37 to bear against the end face of the shaft 30. Below such wall, the hub is of reduced diameter and forms a bearing sleeve 38 which terminates at its upper end at an outward facing shoulder 40.

The driven portion of the assembly comprises a driven drum element 42 having an outer cylindrical wall forming a drum 44 adapted to be engaged from within by centrifugal clutch shoes 46 and from outside by a brake band 48. The lower end of the cylindrical drum 44 is joined to a radial web 50 extending inward to an inner cylindrical bearing ring 52 which lies within the axial length of the drum 44 and carries an in-turned lip or flange 54 at its end. A ball bearing has its inner race 56 mounted on the bearing sleeve 38, preferably with a press-fit, and has its outer race 58 mounted in the bearing ring 52 of the driven drum element, also preferably with a press-fit. The web 50 of the driven drum element carries a pair of bolts 60 having knurled upper portions pressed into locking engagement with the metal of the web 50. A blade mounting and retaining plate 62 is mounted against the lower face of the web 50 and is normally retained thereon by a tight fitting relation with the bolts 60. Such plate extends inward into underlapping relation with the outer race 58 of the ball bearing, to positively secure the same in the bearing ring 52 and against the lip 54 when a blade 15 is bolted against the mounting plate 62.

The hub is secured on the shaft 30 by a bolt 64 threaded into a bore in the shaft. The head of the bolt engages a pilot washer 66 which is of sufficient size to engage the inner race 56 of the ball bearing, and thrust that race against the shoulder 40 on the hub 32, and thereby clamp the bearing race and the hub to the end of the shaft 30. The compact arrangement provides a firm support from the shaft 30 for the driven drum element and blade which are supported by the ball bearing, and allows free relative rotation between the shaft and the driven assembly.

The centrifugal clutch shoes 46 are mounted on a carrier plate 70 fixed, as with splines, on the large upper portion of the hub 32. Desirably and as shown, each clutch shoe 46 is made of two complementary formed metal parts which are riveted together by rivets 71 and which define between them a flat tapered radial socket 72 for the reception of driving lugs 74 on the shoe carrier plate 70. The sockets 72 are desirably displaced from the circumferential centers of the shoes 46 toward the leading ends thereof, so as to give the shoes a soft engaging action and prevent the clutch from locking or grabbing. The two shoes are interconnected at their ends by springs 76, engaged in holes formed in the ends of the shoes, and the springs are of calibrated characteristics to control the clutch engagement and disengagement speeds.

Rotary mower engines are commonly built with a light weight flywheel and air blower at the top, and rely for a major portion of their required flywheel mass on the presence of a mower blade which is fixed to and rotates with the engine shaft. Since the present invention requires the engine shaft to rotate independently of the mower blade, if an engine of this character is utilized it is desirable to provide additional flywheel mass. This is done by mounting a flywheel 80 on the upper portion of the hub 32. The flywheel may be fixed on the hub in any convenient way, as by engaging it with splines 82 on the hub and staking it in place. When the engine used is provided with its own heavy flywheel, the flywheel 80 may be omitted.

The blade mounting and driving assembly described is located below the mower deck and at the center of the blade cutting space. To protect it from contamination, it is desirably enclosed by a stamped bowl 84. The bowl has a peripheral mounting flange 86, which desirably rests against the top surface of the deck 11 of the mower and between that deck and the mounting flange 13 of the engine 10. The flange 86 is relatively thin, so that it does not significantly change the position of the engine 10 or its shaft 30, and its engagement against the top face of the deck 11 provides for accurate location relative to the reference surfaces of the deck and motor mounting. The bowl 84 has a generally cylindrical upper portion 86 of sufficient diameter to clear the flywheel 80, and this is joined at its lower edge to a horizontal radial wall forming a platform 88 which is used for mounting the brake assembly. The inner edge of the platform 88 joins a downward extending section 90 which is joined to a generally radial annular portion 92 having a lip 94 at its inner edge in close running proximity with the lower edge of the drum 44.

Figure 5:
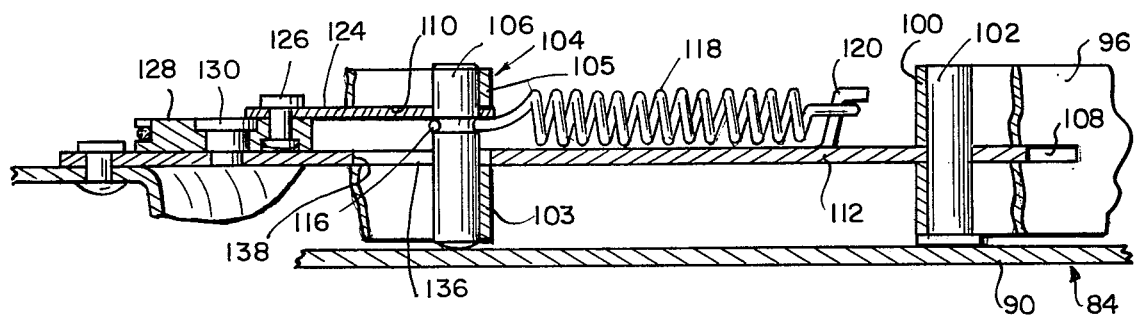
FIG. 5 is a vertical section through the brake mounting and actuating mechanism, taken generally on the line 5—5 of FIG. 3.

The brake comprises a band 96 having a lining 98 of a length to engage the outer face of the drum 44 over about three-fourths of its circumference. The ends of the band 96 extend beyond the ends of the lining 98 and are turned back upon themselves to form an anchor loop 100 engaing an anchoring pin 102 and a loop 104 for engaging an actuating pin 106. As shown in FIG. 5, the ends of the band are bifurcated. The loop 100 at the fixed end of the band 96 contains a central narrow slot 108, while the forward loop 104 at the free end of the band has a wider slot 110 formed between a lower tongue 103 of the same width as the lower tongue of the loop 100, and an upper narrower tongue 105 spaced above the lower tongue 103.

Figure 3:
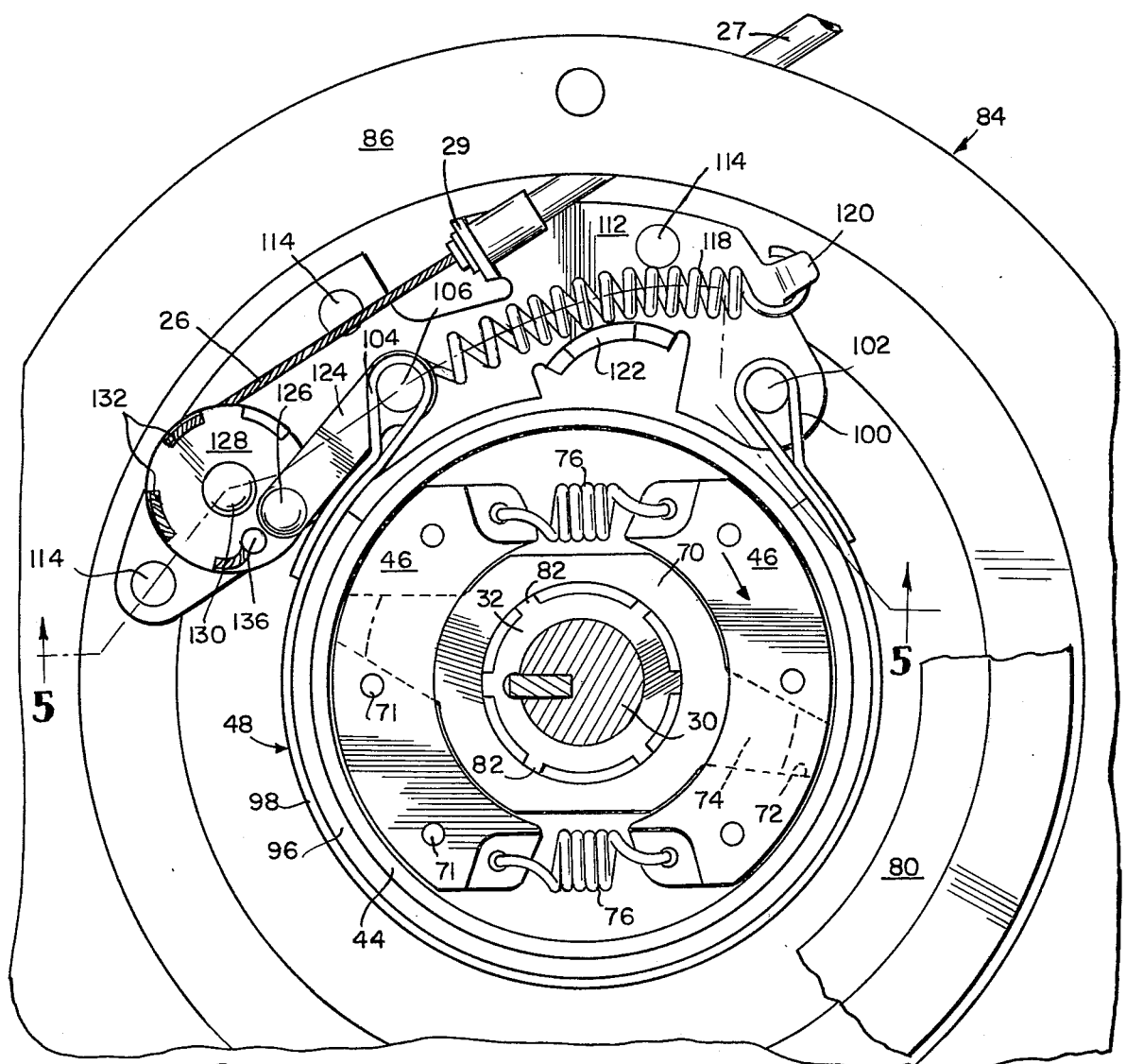
FIG. 3 is a horizontal section taken on the line 3—3 of FIG. 2, with the flywheel largely broken away to expose the underlying assembly, with the parts shown in brake-applied position and the engine at rest.

The brake is supported by a brake mounting plate 112, mounted on the platform 88 of the bowl 84, and fixed thereto by rivets 114. As shown in FIG. 3, the brake mounting plate 112 is a generally arcuate plate with an outer portion which overlies the platform 88 and an inner portion which projects inward in generally parallel-spaced relation with the annular lower portion 92 of the bowl 84 so as to define a brake clearance space between itself and that portion. The shaft 30 and the clutch shoes 46 rotate clockwise as shown in FIG. 3. The clockwise end of the brake mounting plate 112, shown to the right in FIGS. 3 and 5, lies in the central slot 108 of the fixed end 100 of the brake band, and that end is anchored to the plate 112 by the anchor pin 102. As shown in FIG. 5, the pin 102 has a head on its lower end which is held against escape by the underlying portion 92 of the bowl 84. The loop 104 at the opposite end of the brake band is engaged about an actuating or draw pin 106. Such pin has a groove intermediate its ends, and is held in place by engagement of a spring hook 116 in such groove. The hook is at the end of a tension spring 118 stretched between the draw pin 106 and an up-turned ear 120 near the opposite end of the brake mounting plate 112. The spring 118 pulls the brake band 96 into engagement with the drum 44 so that the brake is normally in applied position. To prevent the spring from moving into contact with the drum when the brake is released, a guard finger 122 is bent up from the inner edge of the mounting plate 112 and lies against the side of the spring 118.

Figure 6:
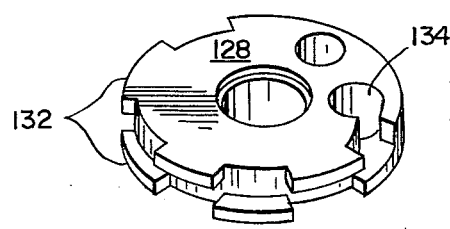
FIG. 6 is an isometric view of the crank wheel of the brake actuating mechanism.

For releasing the brake, the draw pin 106 is connected by a link 124 to a crank pin 126 on a crank wheel 128 rotatably mounted by a pivot stud 130 on the brake mounting plate 112. As shown in FIG. 6, the crank wheel 128 is formed with a peripheral series of oppositely offset lugs 132 which together define a circumferential groove, and with an anchor socket 134 connected to the groove. The brake control cable 26 is engaged in the groove and has a cross pin 136 fixed to its end and received in the socket 134. The sheath 27 of the cable 26 is anchored to an ear 29 bent up from the outer edge of the plate 112, so as to transmit cable reaction to that plate. When the brake cable 26 is pulled by the deadman lever 18, it rotates the crank wheel 128 from the braking position shown in FIG. 3 to the release position shown in FIG. 4, and this acts through the link 124 to pull the free end of the brake band against the spring pressure and releases the brake band from the drum 44.

Figure 4:
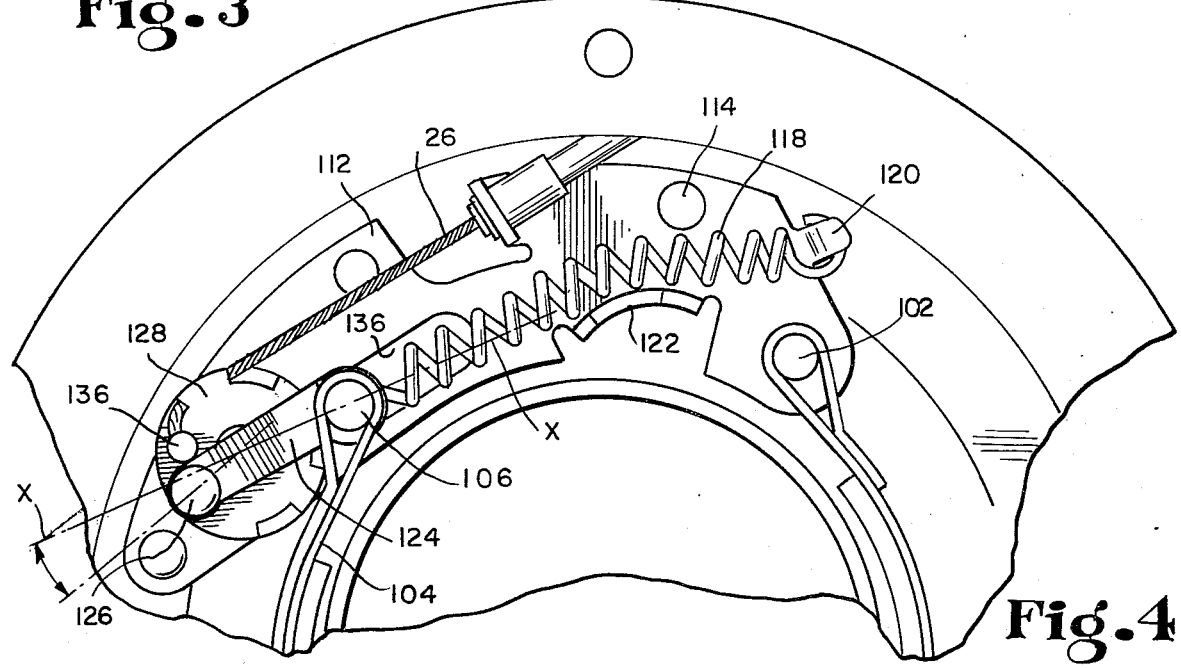
FIG. 4 is a fragmentary view similar to FIG. 3, showing the brake actuating mechanism in brake-release position.

The actuating pin 106 at the movable end of the brake band extends through a slot 136 and rides in that slot as a guide during its movement between braking and release positions. The counterclockwise end of such slot 136 is positioned to form a stop 138 which stops the travel of the pin 106 at the point shown in FIG. 4 at which the crank pin 126 is close to but spaced a shot distance from a dead center position. In FIG. 4, the dead center position is indicated by the center line X—X. The position of the crank pin is desirably in the range of from 4° to 15° before dead center and preferably between 6° and 10° from dead center. This shortens the effective lever arm of the torque exerted on the crank wheel by the spring in relation to the lever arm of the torque exerted by the cable 26, so that when the brake is in released position, spring force is taken almost entirely by the crank wheel 128 and its pivot stud 130, and only a small portion of such force, from 10 to 15%, is exerted on the brake cable 26 and through it to the deadman lever 18. Accordingly, the deadman lever 18 can be easily held in operating position, but when released, will be promptly pulled by the spring 118 to its deadman position in which the brake is applied and the engine throttled to idle condition.

Operation of the embodiment of FIGS. 1–6 is as follows: With the deadman lever 18 in its released or deadman position as shown in FIG. 1, the engine throttle 14 is in engine idling position and the blade control cable 26 is slack and extended as shown in FIG. 3 and the crank pin 126 and link 124 are in slack position, so that the spring 118 acts to pull the brake band into applied engagement with the drum 44. With the engine at rest, the clutch shoes 46 are retracted by the springs 76 so that they are free from the drum 44 and permit the hub 32 and the engine shaft 30 to rotate freely while the mower blade 15 is held stationary by the brake. Under these conditions, the engine can be started and run at idle speed, while the drum 44 is positively held against rotation by the brake and the blade is thus held stopped. To actuate the blade, the deadman lever 18 is swung up against the mower handle 16 and held in that actuated position. This pulls the brake cable 26 through its actuating movement so that it rotates the crank wheel 128 from the slack position shown in FIG. 3 to the actuated position shown in FIG. 4. The link 124 pulls the free end of the band against spring pressure to released position and the drum 44 is then free to rotate. The deadman lever also pulls the throttle cable 14, and this accelerates the engine and causes the shoes 46 to move by centrifugal force against the inside of that drum 44 to clutch that drum to the engine shaft 30. The blade 15 is then driven at mowing speed. In the event the blade becomes overloaded with heavy grass and is slowed, the reduced rotational speed will reduce the clutching action of the shoes 46 and allow the engine to continue running. Even if the blade is completely stopped, the clutch will release sufficently to allow the engine to continue running, and it is only necessary to back the mower off from the heavy grass and it will then clear itself and return to mowing speed and condition.

If and when the deadman lever 18 is released, the spring 118 acts through the linkage and cable to pull the brake band to applied position as shown in FIG. 3. The spring pulls the link 124 to rotate the crank wheel 128 counterclockwise from the position of FIG. 4 to that of FIG. 3, and pulls the control cable 26 through its sheath 27, and this in turn pulls the deadman lever 18 to its released position. Movement of the cable 26 also moves the throttle cable 24 and moves the throttle 14 to idle position. The engine then decelerates, aided by the brake, and the clutch shoes 46 are retracted by their springs 76 to declutch the shaft 30 from the drum 44, and allow the engine to run freely at idle speed while the drum and blade are braked to a stop.

Figure 7:
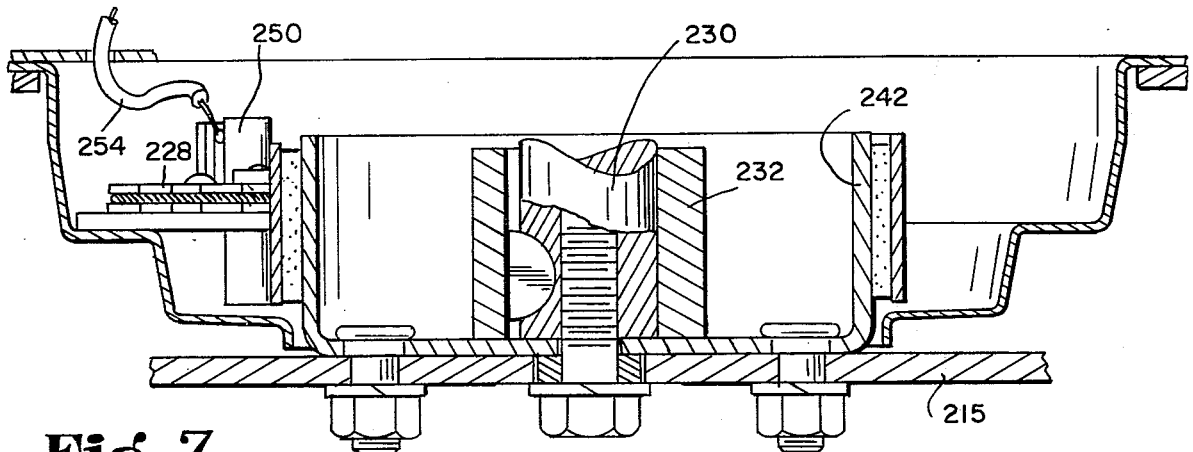
FIG. 7 is a vertical axial section similar to FIG. 2 but showing a modification in which the blade is positively driven by the motor shaft.
Figure 8:
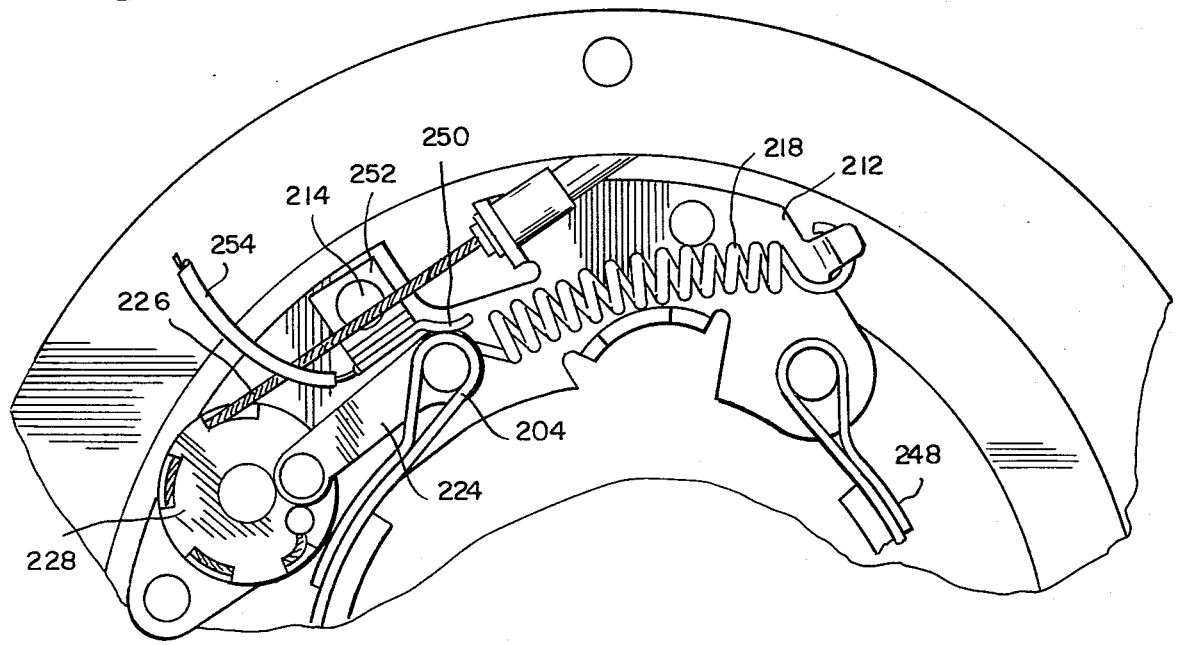
FIG. 8 is a fragmental plan view, similar to FIG. 3, showing an ignition shorting contact in relation to the brake mechanism.

In the modification shown in FIGS. 7 and 8, the blade 215 is bolted directly to a drum 242 which is welded to a hub 232 keyed to the engine shaft 230. There is no releasable clutch between the shaft and the drum. The drum is surrounded by a brake band 248 which is mounted and actuated by mechanism identical with that shown in FIGS. 3, 4, and 6, except for the addition of an ignition shorting contact 250 mounted on and insulated from a supporting bracket 252 held by one of the rivets 214 by which the brake mounting plate 212 is fixed to the bowl. An ignition shorting wire 254 is connected between such contact and the engine spark plug circuit. The shorting contact 250 lies in the path of the movable end loop 204 of the brake band, in a position such that when the brake is applied, that loop engages the contact 250 and connects that contact to ground. This grounds out the ignition of the engine, and kills the engine. The operation of the grounding contact is similar to that disclosed in the Coates U.S. Pat. No. 3,228,177 of Jan. 11, 1966.

Operation of this modification is as follows: The brake control cable 226 is connected to a deadman lever on the mower handle as in FIG. 1. The brake is normally engaged by the action of the spring 218, and the blade is held stationary by the brake. This also holds the engine stationary, and it cannot be started until the deadman lever is pulled to release position. When the deadman lever is pulled to its running position, this pulls the cable 226 to actuate the crank wheel 228 and link 224 and release the brake band. The engine can then be started, and directly drive the blade 215. The mower can then be operated in the usual manner so long as the deadman lever is held in running position. When that lever is released, the brake is automatically applied by the spring 218, and this carries the movable end of the brake band into engagement with the grounding contact 250, and this grounds the ignition of the engine and stops the engine.

I claim:

1. A mounting assembly for mounting a driven element on a coaxial drive shaft, to be selectively driven thereby and released therefrom for braking, comprising
   a hub adapted to be fixed on the shaft and shaped to provide a bearing sleeve terminating at an outward-facing shoulder,
   a driven element having an outer cylindrical drum and an inner bearing ring disposed within a portion of the axial length of the drum and having an in-turned flange at its inner end, said ring being shorter than the drum so as to leave clutch mounting space between the hub and drum,
   a ball bearing having an inner race mounted on the bearing sleeve of the hub and an outer race mounted in the bearing ring of the driven element to support the same for free rotation coaxially with the hub,
   a retainer washer to engage against the outer face of said inner race to secure the race against said shoulder,
   a retainer plate mounted on said driven element and against said outer race to secure the race against said in-turned flange,
   and clutch means mounted between the hub and drum for clutching the drum to the hub, said clutch means comprising a clutch shoe carrier on the hub within the drum, and clutch shoes carried by the carrier in nested relation between the bearing ring and the drum of said driven element, and movable outward into clutching engagement with the drum.

2. An assembly as in claim 1 in which said hub contains a bore for the reception of the drive shaft, the bore terminating at an inner end face for engagement against the end face of the shaft, and a bolt or the like for threaded engagement with the drive shaft and to clamp the retainer washer axially toward the shaft to thereby secure the inner bearing race against the outward-facing shoulder on the hub and the hub against the end of the shaft.

3. A mounting assembly for mounting a driven element on a coaxial driven shaft, to be selectively driven thereby and released therefrom for braking, comprising
   a hub having a tubular end portion adatped to be received on the end of a drive shaft, a reduced-diameter portion at its opposite end, defining a bearing sleeve and joined to said tubular portion by a radial wall which defines an inner end face for engagement against the end of the shaft and on outward-facing shoulder at the end of said bearing sleeve to locate a bearing thereon,
   a driven element having a bearing ring disposed about said bearing sleeve and having an in-turned flange at its end, a radial web joined to the outer end of said bearing ring, and a cylindrical drum supported by said web in coaxial and axially over-lapping spaced relation with said bearing ring,
   a ball bearing having an inner race mounted on said bearing sleeve and against said outward-facing shoulder, and an outer race mounted in said bearing ring and against said in-turned flange, said bearing thereby supporting the driven element for free coaxial rotation on said hub, a retainer washer for engaging said inner race to secure the same against said outward-facing shoulder, and a bolt or the like to secure the washer toward the shaft and thereby secure the shaft and hub and bearing race in assembled relation, a retainer plate secured to the web of the driven element and engaged against the outer bearing race to secure such race in the bearing ring and against said in-turned flange, centrifugal clutch shoes carried with the hub in nested relation between the bearing ring and drum, said shoes being biased to retracted position in which they are declutched from the drum and being centrifugally engageable with said drum for driving element from the hub, a brake band encircling said drum, a brake mounting plate and means to anchor one end of the brake band, a spring or the like normally urging the free end of the brake band in a direction to apply the brake band to the drum, a crank wheel rotatably mounted on said plate and having an eccentric crank pin thereon, a link connecting the free end of the brake band to the crank pin, and a manually operable tension member engaged about the periphery of the wheel and operable to rotate the same and swing the crank pin between a normal position in which it allows the spring to apply the brake and an actuated position in which the brake band is moved against the spring force to a released position, the crank pin in said actuated position being close to dead center so as to substantially reduce the effecting lever arm of the torque exerted by the spring on the crank wheel relative to the lever arm of the torque exerted at the periphery of the wheel by said manually operable tension member.

4. An assembly as in claim 3 with the addition of a bowl enclosing said assembly and shaped to define an arcuate mounting platform spaced from said drum, said brake mounting palte being an arcuate plate mounted on said platform.

5. Actuating mechaniam for a band brake applied to the drum of a rotor which is normally braked and is manually released as by a deadman control, comprising an anchor for one end of the band, a spring or the like connected to normally urge the free end of the brake to brake-applied position, a link for moving the free end of the brake against the spring to a brake-released position, a crank wheel to which the link is pivotally connected at an eccentric point, said wheel being rotatable to carry said eccentric point between a normal slack position in which it allows the spring to apply the brake, and an actuated position in which it holds the brake band in released position, and a manually operable tension member wrapped about the periphery of the wheel and operable when pulled to rotate the same for moving the eccentric point from its slack position to its actuated position, said actuated position of the eccentric point being close to but short of a dead center position in its path of revolution about the axis of the wheel so as to maintain a small spring force tending to return the eccentric point to its slack position but to substantially reduce the effective lever arm of the torque exerted on the wheel by the spring and thereby reduce the manual force on the cable required to maintain the brake in released position.

6. Actuating mechanism as in claim 5 in combination with a protective bowl mounted about the rotor drum and shaped to define a mounting platform intermediate the height of the drum and spaced radially therefrom, a mounting plate mounted on said platform and extending about a circumferential portion of the drum, the brake band having bifurcated ends straddling the mounting plate and supported thereby in the plane of the plate, said one end of the band being anchored to such plate, the free end of the band being connected to a draw pin extending through the plate, the crank wheel being rotatably mounted on the plate and connected by the link to such draw pin to move the same toward release position, and said spring being connected between said draw pin and an anchor on the mounting plate to move the draw pin toward brake-applied position, whereby the mounting plate assembly is a substantially self-contained assembly supporting the brake band in operative position from the mounting platform on the bowl.

7. Actuating, protective and support mechanism for a band brake applied to the drum of a rotary mower blade carrier which is positioned below a supporting mower deck, is normally braked and is manually released as by a deadman control, comprising a bowl for enclosing th rotor drum, said bowl having a mounting flange for mounting on the mower deck, and being shaped to surround such drum, said bowl having a generally circular side wall extending downward from said flange, an inward-extending flange portion joined to said side wall at the bottom thereof and forming an annular flat mounting platform intermediate the height of the drum and spaced radially outward from the drum, a brake mounting plate mounted on the platform and extending arcuately about the drum, a brake band having one end anchored to said plate, a spring or the like connected between an anchor on said plate and the free end of the brake band and acting to bias the brake band to applied position relative to the drum, and manually operable tension means connected to the free end of the brake band and operative when pulled to actuate the brake band to released position, and a reaction bracket on said platform for guiding said tension means in its operation.

8. In a lawn mower comprising a blade drive shaft depending below a mower deck, a blade carrier rotatably mounted on such shaft and including a drum rotatable with said carrier and adapted to be engaged by an encircling brake band, the improvement comprising a bowl for enclosing said drum, having a top mounting flange for mounting the bowl on the mower deck, a generally circular said wall depending from said flange, a generally flat annular platform joined to said side wall at the bottom thereof and extending inward therefrom toward said drum, and a lower wall portion extending downward and inward from the inner edge of said platform into close clearance relation with a lower portion of said blade carrier, a mounting plate mounted on said platform and extending arcuately about the drum, a brake band anchored at one end to said plate and extending therefrom about the drum substantially in excess of 180° so as to present its free end toward said mounting plate, a spring or the like connecting said free end to a spring anchor on said plate and acting to bias the brake band into braking engagement with the drum, a reaction bracket mounted on said platform, and manually operable tension means connected between the free end of the brake band and such reaction bracket and operable to retract the free end of the brake band against the spring bias to release the brake.

* * * * *

UNITED STATES PATENT OFFICE
CERTIFICATE OF CORRECTION

Patent No. 4,035,994      Dated July 19, 1977

Inventor(s) Stephen J. Hoff

It is certified that error appears in the above-identified patent and that said Letters Patent are hereby corrected as shown below:

```
Column 1, line 66, change "shos" to --shoes--.
Column 2, line 2, change "balde" to --blade--;
          line 32, change "or" to --of--;
          line 54, change "by" to --of--;
Column 4, line 1, change "calbe" to --cable--.
Column 8, line 51 (Claim 3), change "adatped" to --adapted--;
          line 56 (Claim 3), change "on" to --an--.
Column 9, line 17 (Claim 3), before "element" insert
                 --the driven--;
          line 37 (Claim 3), change "ing" to --ive--;
          line 44 (Claim 4), change "palte" to --plate--;
          line 46 (Claim 5), change "mechaniam" to
                 --mechanism--.
Column 10, line 35 (Claim 7), change "th" to --the--;
           line 63 (Claim 8), change "said" to --side--.
```

Signed and Sealed this

Twenty-second Day of November 1977

[SEAL]

Attest:

RUTH C. MASON      LUTRELLE F. PARKER
Attesting Officer      Acting Commissioner of Patents and Trademarks